March 20, 1951 — C. L. CONNER — 2,545,723
ROTARY SIDE DELIVERY RAKE
Filed Jan. 7, 1948 — 3 Sheets-Sheet 1
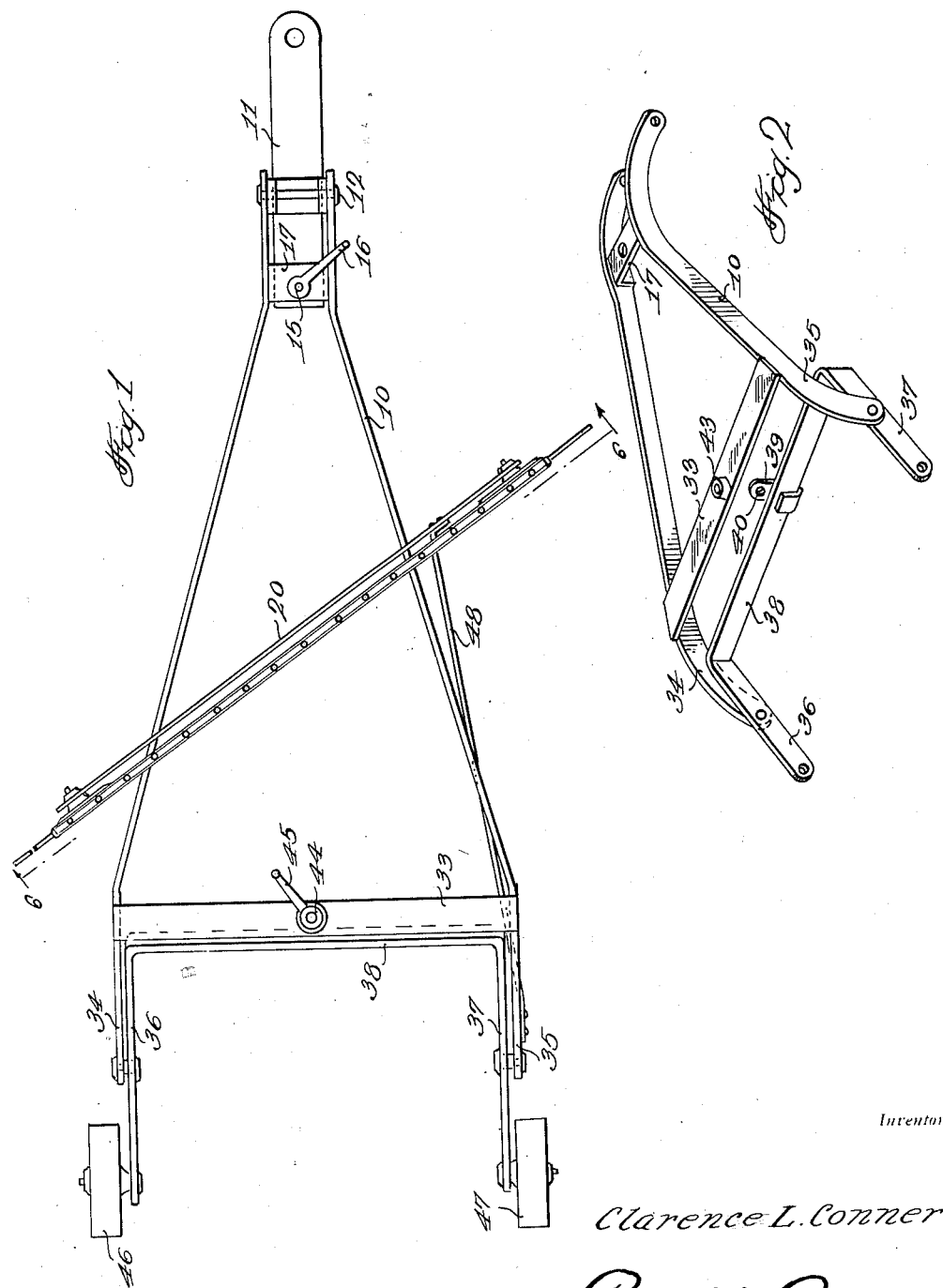
Inventor
Clarence L. Conner
By Randolph & Beavers
Attorneys

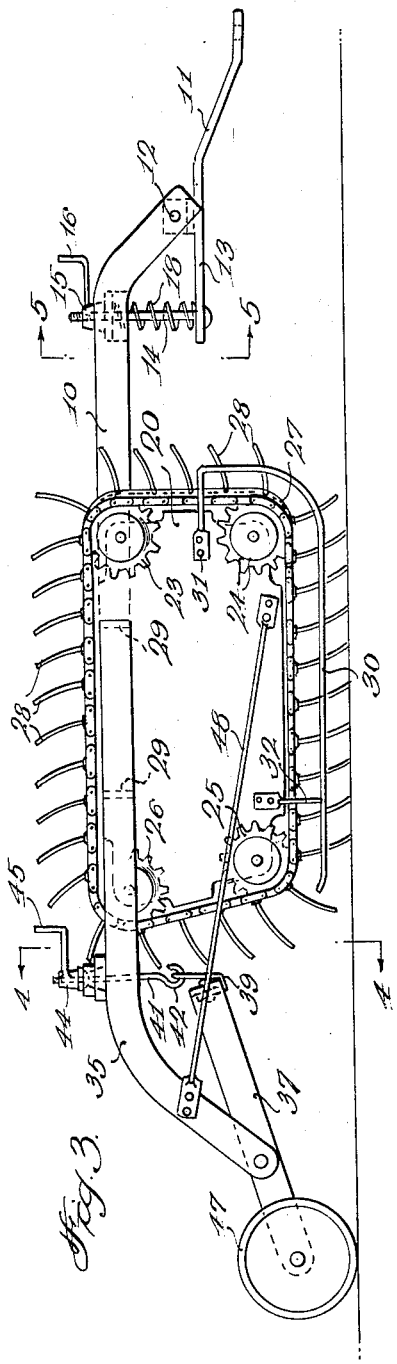

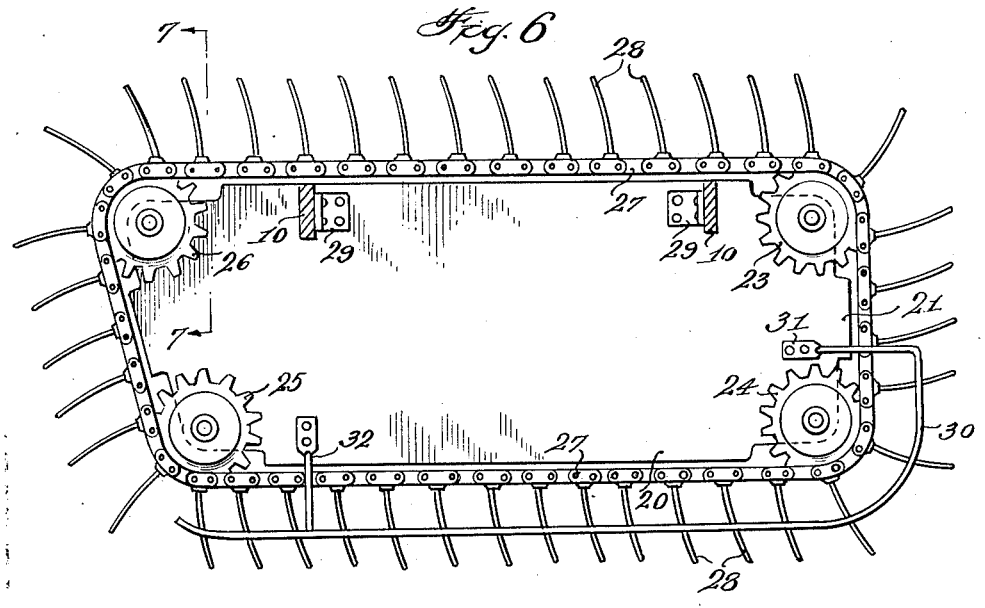
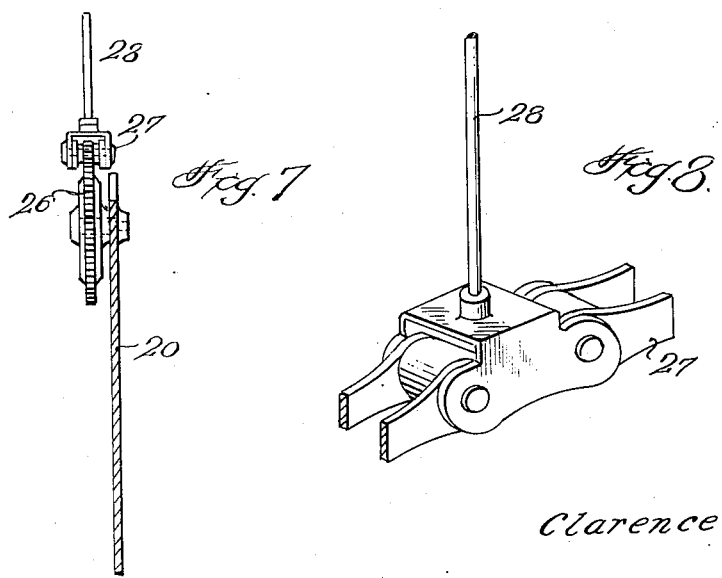

Patented Mar. 20, 1951

2,545,723

UNITED STATES PATENT OFFICE 2,545,723

ROTARY SIDE DELIVERY RAKE

Clarence L. Conner, McFarland, Calif.

Application January 7, 1948, Serial No. 887

1 Claim. (Cl. 56—376)

The present invention relates to mechanical hay rakes and it consists in the combinations, constructions and arrangements of parts herein described and claimed.

It is an object of the present invention to provide a mechanical hay rake which is self-actuating by its forward movement over the ground without the necessity of a power takeoff from the supporting wheels usually associated with mechanical hay rakes.

Another object of the invention is the provision of a novel arrangement of tines upon an endless chain forming a part of the invention.

Another object of the invention is the provision of novel and simple means for raising and lowering the operable parts of a mechanical hay rake with respect to the ground.

A further object of the invention is the provision of a guard for guiding the hay and at the same time preventing it from passing between the moving parts of the mechanism.

Another object of the invention is the provision of a novel bracing means for the tines of a mechanical hay rake.

A still further object of the invention is the provision of a novel endless chain construction having spaced tines thereon.

Other and further objects of the invention will become apparent from a reading of the following specification taken in conjunction with the drawings, in which:

Figure 1 is a plan view of an embodiment of the invention,

Figure 2 is a perspective view of a portion of the apparatus shown in Figure 1,

Figure 3 is a side elevational view of the mechanism shown in Figure 1,

Figure 4 is a sectional view taken along line 4—4 of Figure 3,

Figure 5 is a sectional view taken along line 5—5 of Figure 3,

Figure 6 is an enlarged sectional view taken along line 6—6 of Figure 1,

Figure 7 is a sectional view taken along line 7—7 of Figure 6, and

Figure 8 is an enlarged fragmentary perspective view showing certain elements of the invention.

Generally there is provided a mechanical rake having a frame supported upon a pair of wheels and having vertically dependent therefrom at a 45 degree angle to the longitudinal axis of the frame an endless chain mounted upon four sprockets and having a plurality of outwardly extending tines so shaped as to extend slightly in the direction of the motion of the mechanism over the ground when in contact therewith. The tines engaging the ground will cause a continuous movement of the chain rearwardly at an angle to the direction of motion of the machine over the ground, thereby delivering hay to one side of the machine. No connection is necessary with the supporting wheels of the frame to impart motion to the chain and its attached tines. Provision is made for raising and lowering the chain with respect to the ground and a guard, preferably of sheet metal, is positioned within the area encompassed by the chain.

Referring more particularly to the drawings, there is shown therein a mechanical rake comprising a substantially triangular frame 10, at the forward or apex end of which is pivotally connected a tongue 11, as indicated at 12. The tongue is provided with a rearwardly extending portion 13 adjacent the rear end of which is journaled the lower end of a vertically extending shaft 14, the upper end of which is threadably mounted in a collar 15 to which is affixed an operating handle 16. The shaft 14 extends through a cross member 17 carried by the frame 10. A compression spring 18 is interposed between the cross member 17 and the portion 13.

To the frame 10 is welded or otherwise affixed a flat guard member 20 which extends vertically downwardly therefrom and whose plane forms a rearwardly extending angle of approximately 45 degrees with the longitudinal axis of the machine.

The guard 20 presents a substantially vertical front edge 21 and a rear edge 22 which extends upwardly and outwardly. The top and bottom edges are substantially parallel with the ground.

At each corner of the guard 20, there is mounted a sprocket 23, 24, 25 and 26, respectively, over which is trained an endless chain 27, each alternate link of which is provided with an outwardly extending tine 28, each of which is curved slightly in a forward direction when positioned at the bottom of the guard 20, that is to say, between the sprockets 24 and 25. The guard is affixed to the frame 10 by brackets 29.

A guide rail 30 is affixed adjacent the front end of the guard 20 by a bracket 31 and extends along the forward and lower edges of the guard 20 in spaced relation thereto and inwardly of the outer extremities of the tines 28 and is also supported by a bracket 32 adjacent the rear of the guard 20.

A transversely extending bar 33 is affixed adjacent the rear of the frame 10 and the sides of the frame extend rearwardly and downwardly to form legs 34 and 35 to which are centrally and pivotally connected, respectively, the arms 36 and 37 of a U-shaped member 38 which has centrally mounted thereon an upwardly extending dog 39 having an opening 40 therein.

A shaft 41 is provided with an integrally formed hook 42 at its lower end, which is adapted to engage in the opening 40 and extends upwardly through a journal 43 formed centrally in the bar 33 and is threadably engaged in a collar 44 to which is affixed a handle 45.

To the rearmost ends of the U-shaped member 38 there is revolubly mounted supporting wheels 46 and 47 and a brace bar 48 interconnects the arm 37 and a point adjacent the forward end of the guard 20.

In operation, it will be apparent that the draw bar 11 may be attached to a tractor or the like for moving the same over the ground and that the tines 28 adjacent the ground may be adjusted in position with respect to the ground by manipulating the handles 16 and 45 which will raise or lower the forward and rearward ends, respectively, of the frame 10.

The machine is then moved over the ground and the tines will engage the ground and be forced to move rearwardly and to one side in a raking movement, thus causing hay which may be in its path to be moved to one side of the machine. The guard 20 prevents any hay from escaping the raking movement by passing over the tines and the guide rail 30 prevents the tines 28 from bending by bracing the same and at the same time help to keep the individual tines free of foreign matter. It will also be noted that that part of the chain 27 which is adapted to move upwardly, that is to say, the portion thereof between the sprockets 25 and 26, extends upwardly and outwardly so that hay will fall therefrom by gravity at the end of the raking operation.

While but one form of the invention has been shown and described herein, it will be readily apparent to those skilled in the art that many minor modifications may be made herein without departing from the spirit of the invention or the scope of the appended claim.

What is claimed is:

An apparatus of the character described comprising a frame, a flat metal guard member vertically dependent from the frame at an angle to the longitudinal axis thereof, sprockets revolubly mounted at each corner of the guard member, a chain trained over said sprockets, tines outwardly disposed on said chain, a rearwardly extending bracing rod interconnecting the frame and the guard member, a guide rail carried by said guard member in spaced relation thereto and adjacent the rear faces of the lowermost tines, means for raising and lowering the rear end of the frame and means for raising and lowering the forward end of the frame.

CLARENCE L. CONNER.

REFERENCES CITED

The following references are of record in the file of this patent:

UNITED STATES PATENTS

| Number | Name | Date |
| --- | --- | --- |
| 476,961 | McPherson | June 14, 1892 |
| 532,079 | Mathurch | Jan. 8, 1895 |
| 554,794 | Rex | Feb. 18, 1896 |
| 635,277 | Devilliers | Oct. 17, 1899 |
| 2,315,522 | Hauge | Apr. 6, 1943 |
| 2,447,354 | Morrill | Aug. 17, 1948 |

FOREIGN PATENTS

| Number | Country | Date |
| --- | --- | --- |
| 16,403 | Great Britain | July 17, 1911 |